US011242842B2

(12) United States Patent
Kaucic et al.

(10) Patent No.: US 11,242,842 B2
(45) Date of Patent: Feb. 8, 2022

(54) SYSTEM AND METHOD FOR FORECASTING POWER OUTPUT OF A WIND FARM

(71) Applicant: GENERAL ELECTRIC COMPANY, Schenectady, NY (US)

(72) Inventors: Robert August Kaucic, Niskayuna, NY (US); Zhanpan Zhang, Niskayuna, NY (US); Subhankar Ghosh, Bengaluru (IN); Hongyan Liu, Schenectady, NY (US); Necip Doganaksoy, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 523 days.

(21) Appl. No.: 16/303,243

(22) PCT Filed: May 19, 2017

(86) PCT No.: PCT/US2017/033683
§ 371 (c)(1),
(2) Date: Nov. 20, 2018

(87) PCT Pub. No.: WO2017/205221
PCT Pub. Date: Nov. 30, 2017

(65) Prior Publication Data
US 2019/0203696 A1    Jul. 4, 2019

(30) Foreign Application Priority Data
May 23, 2016    (IN) .............................. 201641017621

(51) Int. Cl.
*F03D 9/00* (2016.01)
*H02P 9/04* (2006.01)
(Continued)

(52) U.S. Cl.
CPC ............. *F03D 7/046* (2013.01); *F03D 7/028* (2013.01); *F03D 7/048* (2013.01); *F03D 17/00* (2016.05); *F05B 2260/821* (2013.01); *F05B 2270/335* (2013.01); *Y02E 10/72* (2013.01)

(58) Field of Classification Search
CPC .......... F03D 7/028; F03D 7/046; F03D 7/048; F03D 17/00; F05B 2260/821; F05B 2270/335
See application file for complete search history.

(56) References Cited

U.S. PATENT DOCUMENTS 6,975,925 B1 * 12/2005 Barnes .................... F03D 7/048
                                                              700/286
8,200,435 B2 * 6/2012 Stiesdal .................. G01W 1/10
                                                                702/3
(Continued)

FOREIGN PATENT DOCUMENTS

CN        102 562 469 A     7/2012
CN        103 473 621 A     12/2013
(Continued)

OTHER PUBLICATIONS

PCT Search Report, dated Aug. 29, 2017.
Chinese Office Action with Translation, dated Oct. 8, 2019.

*Primary Examiner* — Tulsidas G Patel
*Assistant Examiner* — Thomas K Quigley
(74) *Attorney, Agent, or Firm* — Dority & Manning, P.A.

(57) ABSTRACT

The present disclosure is directed to a system and method for forecasting a farm-level power output of a wind farm having a plurality of wind turbines. The method includes collecting actual operational data and/or site information for the wind farm. The method also includes predicting operational data for the wind farm for a future time period. Further, the method includes generating a model-based power output forecast based on the actual operational data, the predicted (Continued)

operational data, and/or the site information. In addition, the method includes measuring real-time operational data from the wind farm and adjusting the power output forecast based on the measured real-time operational data. Thus, the method also includes forecasting the farm-level power output of the wind farm based on the adjusted power output forecast.

12 Claims, 6 Drawing Sheets

(51) Int. Cl.
*F03D 7/04* (2006.01)
*F03D 7/02* (2006.01)
*F03D 17/00* (2016.01)

(56) References Cited

U.S. PATENT DOCUMENTS

| | | | |
|---|---|---|---|
| 9,337,656 B2 * | 5/2016 | Westergaard | H02J 3/381 |
| 10,352,973 B2 * | 7/2019 | Egedal | G01R 21/1333 |
| 10,598,157 B2 * | 3/2020 | Badrinath Krishna | F03D 7/028 |
| 10,975,846 B2 * | 4/2021 | Srivastava | H02J 3/38 |
| 2002/0087234 A1 * | 7/2002 | Lof | G06Q 40/06 700/286 |
| 2008/0033786 A1 * | 2/2008 | Boaz | G06Q 10/06375 705/7.31 |
| 2012/0046917 A1 * | 2/2012 | Fang | G01W 1/10 703/1 |
| 2012/0185414 A1 | 7/2012 | Pyle et al. | |
| 2013/0317748 A1 * | 11/2013 | Obrecht | F03D 17/00 702/3 |
| 2014/0244188 A1 * | 8/2014 | Bai | F03D 17/00 702/60 |
| 2014/0344209 A1 * | 11/2014 | Fang | G06N 7/005 706/52 |
| 2017/0016430 A1 * | 1/2017 | Swaminathan | F03D 7/047 |
| 2021/0232109 A1 * | 7/2021 | Chakrabarti | G05B 19/042 |

FOREIGN PATENT DOCUMENTS

| | | |
|---|---|---|
| CN | 103 485 977 A | 1/2014 |
| CN | 103 984 986 A | 8/2014 |
| CN | 105 590 139 A | 5/2016 |

* cited by examiner

SYSTEM AND METHOD FOR FORECASTING POWER OUTPUT OF A WIND FARM

FIELD OF THE INVENTION

Embodiments of the present invention relate generally to wind farms, and more particularly, to systems and methods for forecasting power output of a wind farm or an individual wind turbine.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor having one or more rotor blades. The rotor blades transform wind energy into a mechanical rotational torque that drives one or more generators via the rotor. The generators are sometimes, but not always, rotationally coupled to the rotor through the gearbox. The gearbox steps up the inherently low rotational speed of the rotor for the generator to efficiently convert the rotational mechanical energy to electrical energy, which is fed into a utility grid via at least one electrical connection. Such configurations may also include power converters that are used to convert a frequency of generated electric power to a frequency substantially similar to a utility grid frequency.

A plurality of wind turbines are commonly used in conjunction with one another to generate electricity and are commonly referred to as a "wind farm." Wind turbines on a wind farm typically include their own meteorological monitors that perform, for example, temperature, wind speed, wind direction, barometric pressure, and/or air density measurements. In addition, a separate meteorological mast or tower ("met mast") having higher quality meteorological instruments that can provide more accurate measurements at one point in the farm is commonly provided. The correlation of meteorological data with power output allows the empirical determination of a "power curve" for the individual wind turbines.

Unfortunately, such renewable energy systems can be intermittent in nature, for example, due to changing wind speed, cloud coverage, and/or sun blockage from the photovoltaic panels (in solar power systems). As such, it is difficult to accurately predict or forecast the amount of power that can be generated in the future for such systems. Without accurate power predictions, operators cannot effectively bid into the day-ahead energy markets.

Thus, an improved system and method for more accurately forecasting power output of a wind farm and/or a wind turbine would be advantageous.

SUMMARY OF THE INVENTION

Aspects and advantages of embodiments of the invention will be set forth in part in the following description, or may be obvious from the description, or may be learned through practice of embodiments of the invention.

In one aspect, the present disclosure is directed to a method for forecasting a farm-level power output of a wind farm having a plurality of wind turbines. The method includes collecting actual operational data and/or site information for the wind farm. The method also includes generating a model-based power output forecast based on forecast operational data, the site information, and/or the actual operational data. In addition, the method includes measuring real-time operational data from the wind farm and adjusting the power output forecast based on the measured real-time operational data. Thus, the method also includes forecasting the farm-level power output of the wind farm based on the adjusted power output forecast.

In one embodiment, the actual operational data may include any one of or a combination of the following: power output, torque output, pitch angle, tip speed ratio, yaw angle, temperature, pressure, time of day, month of year, number of wind turbines on-line, wind speed, wind direction, wind shear, wake, wind turbulence, wind acceleration, wind gusts, wind veer, or any other suitable operational data.

In another embodiment, the site information may include any one of or a combination of the following: farm-level power curve, a turbine-level power curve, elevation, wind turbine location, wind farm location, weather conditions, location of nearby wind farms, geographical layout, or any other suitable site condition.

In further embodiments, the method may also include predicting the forecast operational data for the wind farm for a future time period. In yet another embodiment, the step of generating the model-based power output forecast may include using a physics-based model.

In additional embodiments, the method may include adjusting the power output forecast based on the measured real-time operational data via a compensator module. In such embodiments, the compensator module may include a statistical compensator that utilizes at least one of a neural network, regression (linear or non-linear), and/or machine learning to adjust the power output forecast based on the measured real-time operational data. Further, the method may include learning, via the compensator module, one or more deviations between the real-time operational data and the predicted operational data and adjusting the power output forecast based on the learned deviation(s).

In yet another embodiment, the future time period may include from about twelve (12) hours to about seven (7) days in the future. In additional embodiments, the future time period may include less than 12 hours or more than 7 days.

In another aspect, the present disclosure is directed to a method for forecasting a turbine-level power output of a wind turbine. The method includes collecting actual operational data and site information for the wind turbine. The method also includes generating a model-based power output forecast based on forecast operational data, the site information, and/or the actual operational data. In addition, the method includes measuring real-time operational data from the wind turbine and adjusting the power output forecast based on the measured real-time operational data. Thus, the method also includes forecasting the power output of the wind turbine based on the adjusted power output forecast. It should be understood that the method may further include any of the additional steps and/or features as described herein.

In yet another aspect, the present disclosure is directed to a system for forecasting a farm-level power output of a wind farm having a plurality of wind turbines. The system includes a processor configured to perform one or more operations, including but not limited to collecting actual operational data and site information for the wind farm, generating a model-based power output forecast based on forecast operational data, the site information, and/or the actual operational data, measuring real-time operational data from the wind farm, determining a deviation between the real-time operational data and the predicted operational data, adjusting the power output forecast based on the deviation, and forecasting the farm-level power output of the wind farm based on the adjusted power output forecast. It should be understood that the system may further include any of the additional features as described herein.

For example, in one embodiment, the processor may be further configured to adjust the power output forecast based on the deviation via a compensator module.

These and other features, aspects and advantages of embodiments of the present invention will become better understood with reference the following description and appended claims. The accompanying drawings, which are incorporated in and constitute a part of this specification, illustrate the embodiments of the invention and, together with the description, serve to explain the principles of embodiments of the invention.

BRIEF DESCRIPTION OF THE DRAWINGS

A full and enabling disclosure of embodiments of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of embodiments of the invention, not limitation of embodiments of the invention. In fact, it will be apparent to those skilled in the art that various modifications and variations can be made in embodiments of the present invention without departing from the scope or spirit of embodiments of the invention. For instance, features illustrated or described as part of one embodiment can be used with another embodiment to yield a still further embodiment. Thus, it is intended that embodiments of the present invention covers such modifications and variations as come within the scope of the appended claims and their equivalents.

Generally, the present disclosure is directed to a system and method for providing a power forecast for a wind farm and/or individual wind turbine. The system generally includes two parts, including (1) a model-based power predictor module and (2) a compensator module. First, the power prediction module combines multiple configurations of the wind farm and/or wind turbine and forecast data (such as wind speed, wind direction, air pressure, and temperature) with a model representing the relationship between the atmospheric information and the generated wind turbine/wind farm power. Second, the compensator module adjusts the output of the model-based power module based on learned deviations between the predicted and actual power to enable a more accurate power forecast for the wind turbine or the wind farm. For example, the amount to adjust the forecast power can be learned from representative samples of forecast conditions synchronized with the actual power produced by the wind turbine or the wind farm.

The various embodiments of the system and method of the present disclosure provide numerous advantages not present in the prior art. For example, the present disclosure provides accurate real-time, day-ahead, and multi-day power and energy forecasting of the wind farm or an individual wind turbine. Thus, the present disclosure provides direct value in the energy markets including the real-time and day-ahead markets and enables more efficient maintenance planning.

Figure 1:
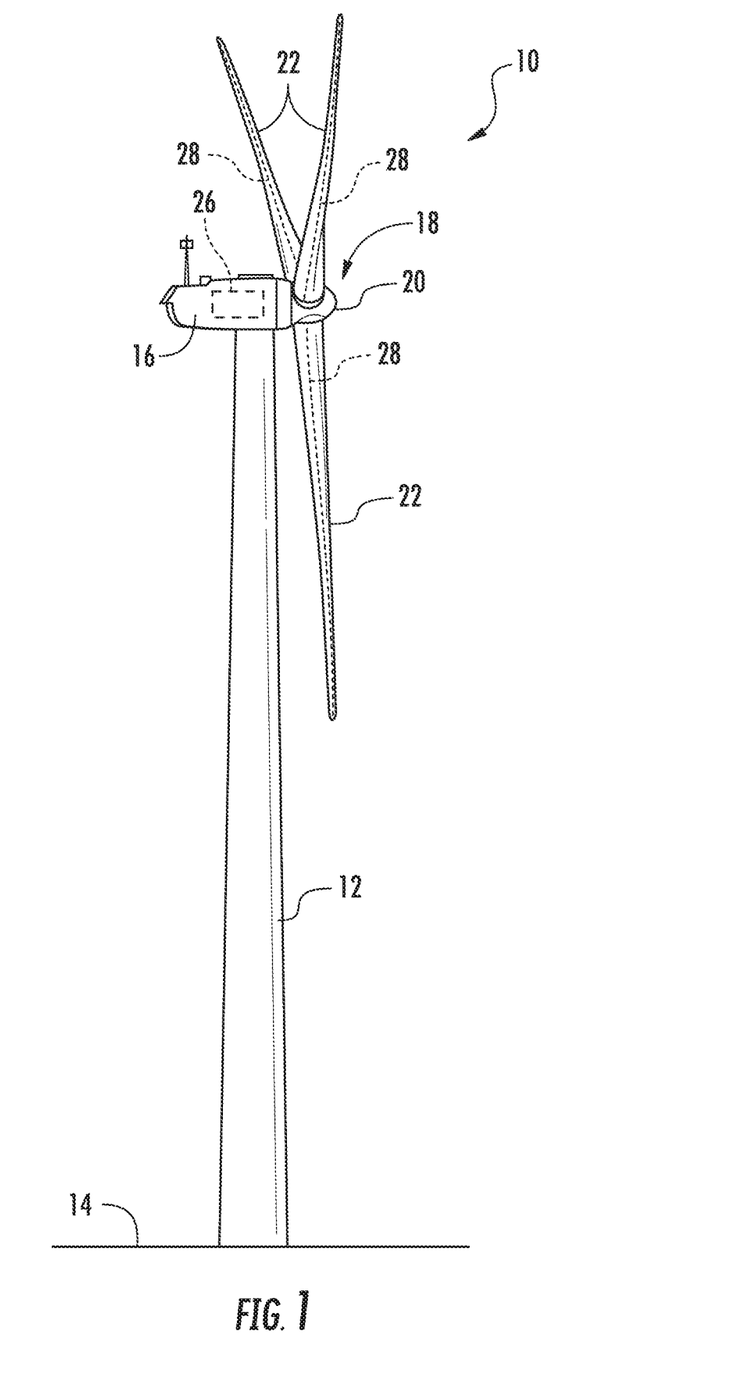
FIG. 1 illustrates a perspective view of one embodiment of a wind turbine according to the present disclosure.

Referring now to the drawings, FIG. 1 illustrates a perspective view of one embodiment of a wind turbine 10 configured to implement the control technology according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator (not shown) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine. Further, the controller 26 may be communicatively coupled to any number of the components of the wind turbine 10 in order to control the operation of such components and/or to implement a control action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. Accordingly, the controller 26 may generally be configured to control the various operating modes of the wind turbine 10 (e.g., start-up or shut-down sequences), de-rate or up-rate the wind turbine 10, and/or control various components of the wind turbine 10. For example, the controller 26 may be configured to control the blade pitch or pitch angle of each of the rotor blades 22 (i.e., an angle that determines a perspective of the rotor blades 22 with respect to the direction of the wind) to control the power output generated by the wind turbine 10 by adjusting an angular position of at least one rotor blade 22 relative to the wind. For instance, the controller 26 may control the pitch angle of the rotor blades 22 by rotating the rotor blades 22 about a pitch axis 28, either individually or simultaneously, by transmitting suitable control signals to a pitch drive or pitch adjustment mechanism (not shown) of the wind turbine 10.

Figure 2:
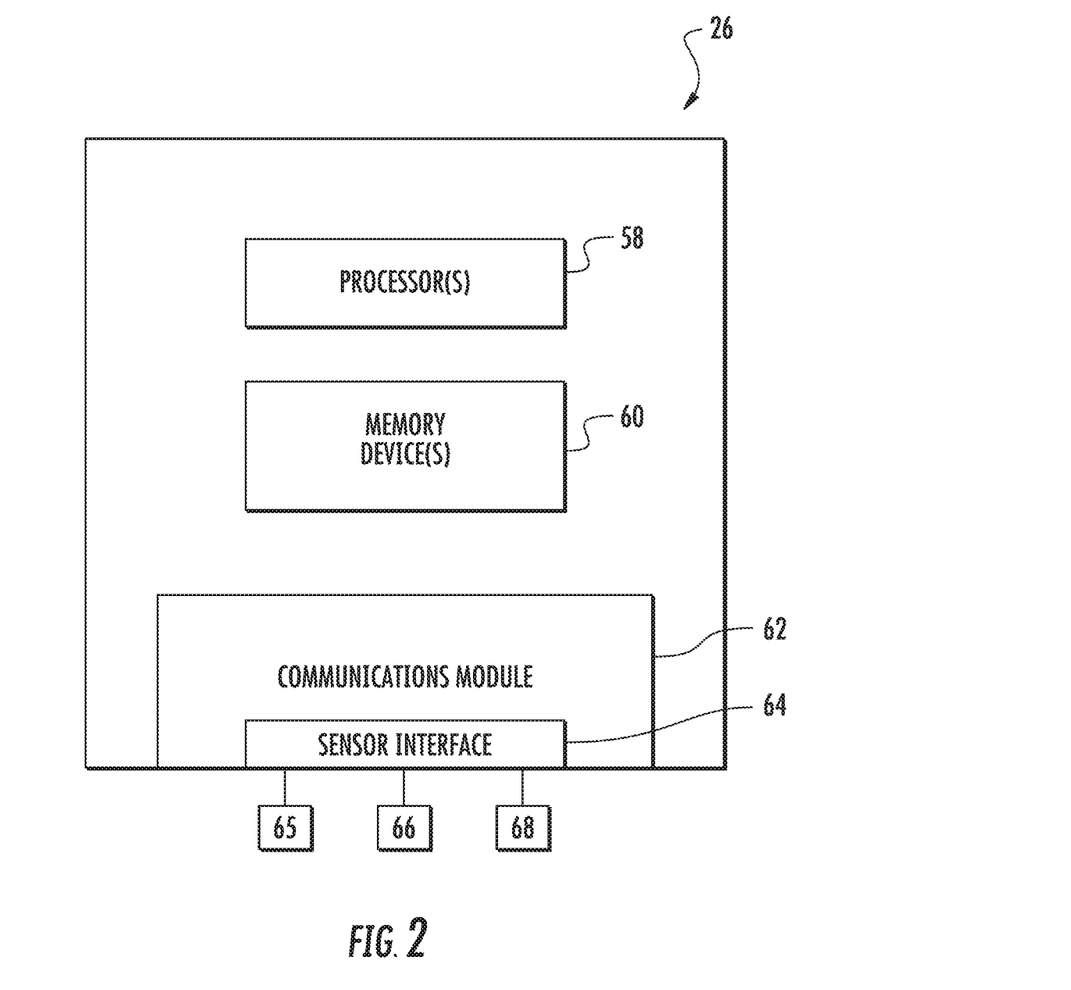
FIG. 2 illustrates a schematic view of one embodiment of a controller for use with the wind turbine shown in FIG. 1.

Referring now to FIG. 2, a block diagram of one embodiment of suitable components that may be included within the controller 26 is illustrated in accordance with aspects of the present disclosure. As shown, the controller 26 may include one or more processor(s) 58 and associated memory device(s) 60 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, application-specific processors, digital signal processors (DSPs), Application Specific Integrated Circuits (ASICs), Field Programmable Gate Arrays (FPGAs), and/or any other programmable circuits. Further, the memory device(s) 60 may generally include memory element(s) including, but are not limited to, computer readable medium (e.g., random access memory (RAM)), computer readable non-volatile medium (e.g., a flash memory), one or more hard disk drives, a floppy disk, a compact disc-read only memory (CD-ROM), compact disk-read/write (CD-R/W) drives, a magneto-optical disk (MOD), a digital versatile disc (DVD), flash drives, optical drives, solid-state storage devices, and/or other suitable memory elements.

Additionally, the controller 26 may also include a communications module 62 to facilitate communications between the controller 26 and the various components of the wind turbine 10. For instance, the communications module 62 may include a sensor interface 64 (e.g., one or more analog-to-digital converters) to permit the signals transmitted by one or more sensors 65, 66, 68 to be converted into signals that can be understood and processed by the controller 26. Furthermore, it should be appreciated that the sensors 65, 66, 68 may be communicatively coupled to the communications module 62 using any suitable means. For example, as shown in FIG. 2, the sensors 65, 66, 68 are coupled to the sensor interface 64 via a wired connection. However, in alternative embodiments, the sensors 65, 66, 68 may be coupled to the sensor interface 64 via a wireless connection, such as by using any suitable wireless communications protocol known in the art. For example, the communications module 62 may include the Internet, a local area network (LAN), wireless local area networks (WLAN), wide area networks (WAN) such as Worldwide Interoperability for Microwave Access (WiMax) networks, satellite networks, cellular networks, sensor networks, ad hoc networks, and/or short-range networks. As such, the processor 58 may be configured to receive one or more signals from the sensors 65, 66, 68.

The sensors 65, 66, 68 may be any suitable sensors configured to measure any operational data of the wind turbine 10 and/or wind parameters of the wind farm 200. For example, the sensors 65, 66, 68 may include blade sensors for measuring a pitch angle of one of the rotor blades 22 or for measuring a loading acting on one of the rotor blades 22; generator sensors for monitoring the generator (e.g. torque, rotational speed, acceleration and/or the power output); and/or various wind sensors for measuring various wind parameters (e.g. wind speed, wind direction, etc.). Further, the sensors 65, 66, 68 may be located near the ground of the wind turbine 10, on the nacelle 16, on a meteorological mast of the wind turbine 10, or any other location in the wind farm.

It should also be understood that any other number or type of sensors may be employed and at any location. For example, the sensors may be accelerometers, pressure sensors, strain gauges, angle of attack sensors, vibration sensors, MIMU sensors, camera systems, fiber optic systems, anemometers, wind vanes, Sonic Detection and Ranging (SODAR) sensors, infra lasers, Light Detecting and Ranging (LIDAR) sensors, radiometers, pitot tubes, rawinsondes, other optical sensors, and/or any other suitable sensors. It should be appreciated that, as used herein, the term "monitor" and variations thereof indicates that the various sensors of the wind turbine 10 may be configured to provide a direct measurement of the parameters being monitored or an indirect measurement of such parameters. Thus, the sensors 65, 66, 68 may, for example, be used to generate signals relating to the parameter being monitored, which can then be utilized by the controller 26 to determine the actual condition.

Figure 3:
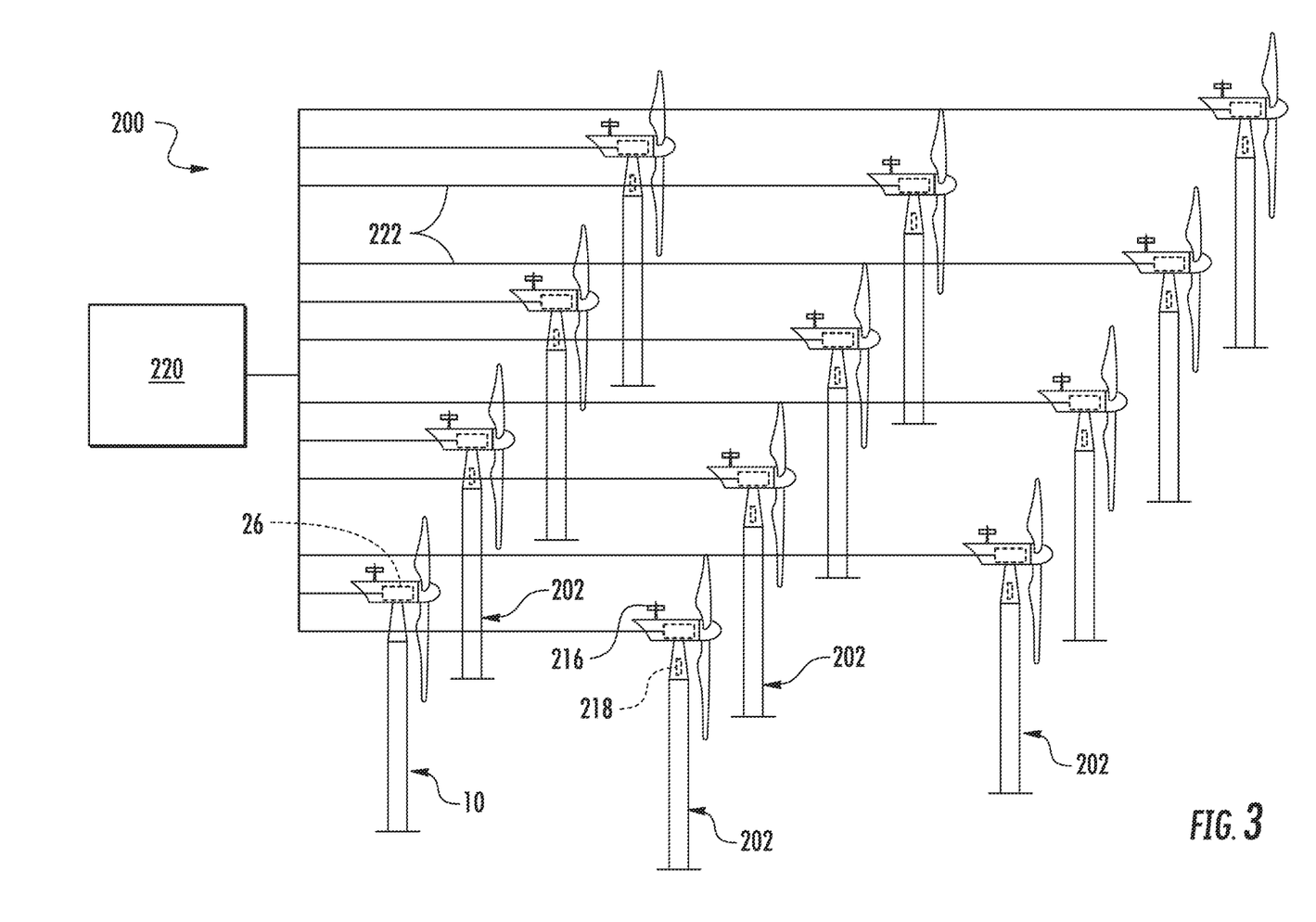
FIG. 3 illustrates a schematic view of one embodiment of a wind farm according to the present disclosure.

Referring now to FIG. 3, a wind farm 200 that is controlled according to the system and method of the present disclosure is illustrated. As shown, the wind farm 200 may include a plurality of wind turbines 202, including the wind turbine 10 described above, and a farm controller 220. For example, as shown in the illustrated embodiment, the wind farm 200 includes twelve wind turbines, including wind turbine 10. However, in other embodiments, the wind farm 200 may include any other number of wind turbines, such as less than twelve wind turbines or greater than twelve wind turbines. In one embodiment, the controller 26 of the wind turbine 10 may be communicatively coupled to the farm controller 220 through a wired connection, such as by connecting the controller 26 through suitable communicative links 222 (e.g., a suitable cable). Alternatively, the controller 26 may be communicatively coupled to the farm controller 220 through a wireless connection, such as by using any suitable wireless communications protocol known in the art. In addition, the farm controller 220 may be generally configured similar to the controllers 26 for each of the individual wind turbines 202 within the wind farm 200. Further, the farm controller 220 may be configured with any of the components described with respect to the turbine controller 26 of FIG. 2.

In additional embodiments, one or more of the wind turbines 202 in the wind farm 200 may include a plurality of sensors for monitoring various operational data of the individual wind turbines 202 and/or one or more wind parameters of the wind farm 200. For example, as shown, each of the wind turbines 202 includes a wind sensor 216, such as an anemometer or any other suitable device, configured for measuring wind speeds or any other wind parameter. For example, in one embodiment, the wind parameters include information regarding at least one of or a combination of the following: a wind gust, a wind speed, a wind direction, a wind acceleration, a wind turbulence, a wind shear, a wind veer, a wake, SCADA information, or similar.

As is generally understood, wind speeds may vary significantly across a wind farm 200. Thus, the wind sensor(s) 216 may allow for the local wind speed at each wind turbine 202 to be monitored. In addition, the wind turbine 202 may also include one or more additional sensors 218. For instance, the sensors 218 may be configured to monitor electrical properties of the output of the generator of each wind turbine 202, such as current sensors, voltage sensors, temperature sensors, or power sensors that monitor power output directly based on current and voltage measurements. Alternatively, the sensors 218 may include any other sensors that may be utilized to monitor the power output of a wind turbine 202. It should also be understood that the wind turbines 202 in the wind farm 200 may include any other suitable sensor known in the art for measuring and/or monitoring wind parameters and/or wind turbine operational data.

Figure 4:
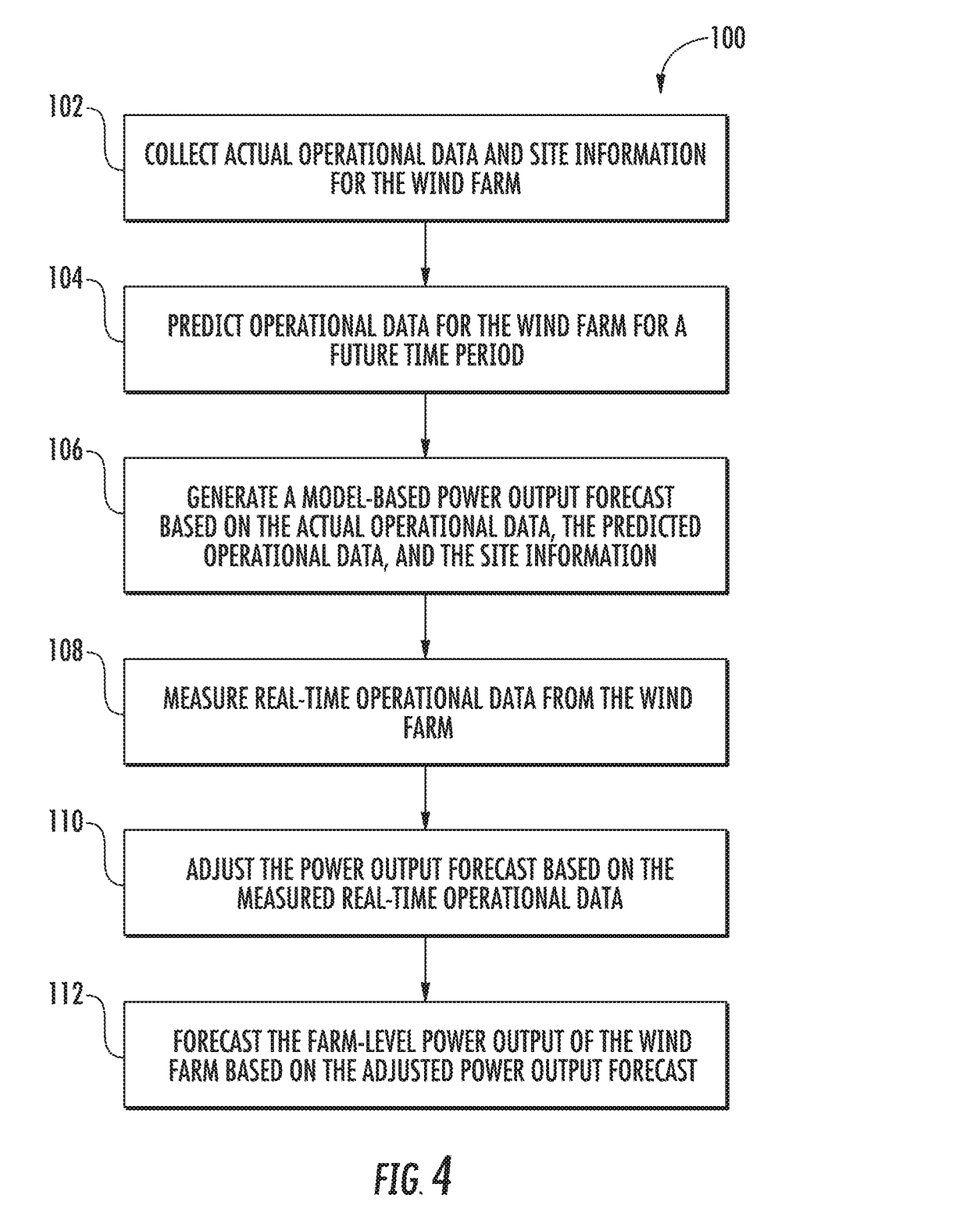
FIG. 4 illustrates a flow diagram of one embodiment of a method for forecasting a farm-level power output of a wind farm having a plurality of wind turbines according to the present disclosure.
Figure 5:
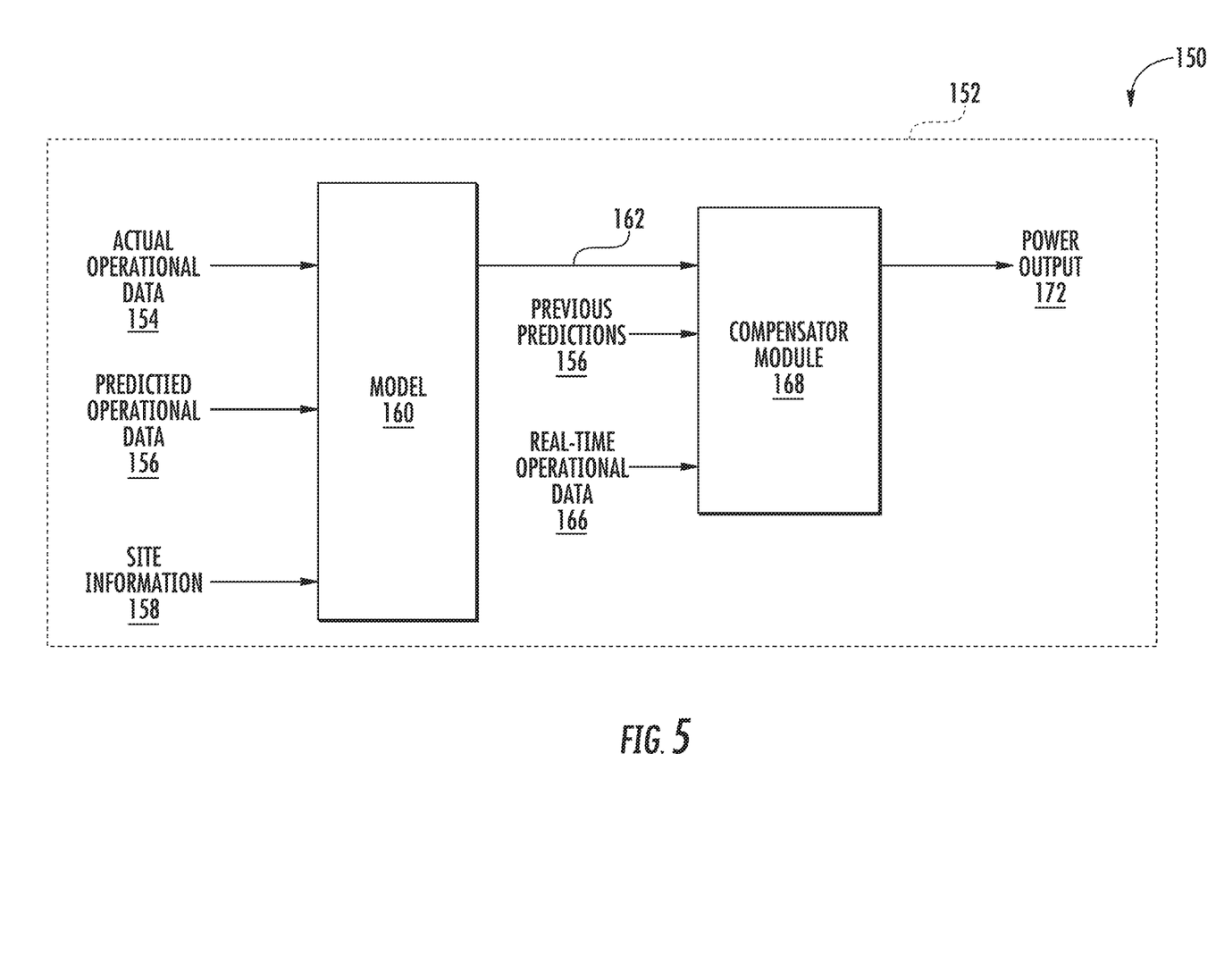
FIG. 5 illustrates a schematic diagram of one embodiment of a system for forecasting a farm-level or turbine-level power output of a wind farm or wind turbine according to the present disclosure; and, FIG. 6 illustrates a schematic diagram of another embodiment of a system for forecasting a farm-level or turbine-level power output of a wind farm or wind turbine according to the present disclosure.

Referring now to FIGS. 4 and 5, a system 150 and method 100 for forecasting a farm-level power output of a wind farm, such as the wind farm 200 of FIG. 3, is illustrated. More specifically, FIG. 4 illustrates a flow diagram of one embodiment of the method 100 for forecasting a farm-level power output of the wind farm 200 and FIG. 5 illustrates a schematic diagram of a processor 152 of the system 150 for forecasting a farm-level power output of the wind farm 200. It should also be understood that the same method may be applied to an individual wind turbine (such as the wind turbine 10 of FIG. 1) in additional to the overall wind farm 200. In one embodiment, the farm controller 220 (or the individual wind turbine controllers 26) may be configured to perform any of the steps of the method 100 as described herein. Further, in additional embodiments, the method 100 of the present disclosure may be performed manually via a separate computer not associated with the wind farm 200.

Thus, as shown at 102, the method 100 includes collecting actual operational data 154 and/or site information 158 for the wind farm 200. More specifically, as shown in FIG. 5, the actual operational data 154 as described herein may include information regarding at least one of or a combination of the following: power output, torque output, pitch angle, tip speed ratio, yaw angle, temperature, pressure, time of day, month of year, number of wind turbines on-line, wind speed, wind direction, wind shear, wake, wind turbulence, wind acceleration, wind gusts, wind veer, or any other suitable operational data. Similarly, as shown, the site information 158 may include any one of or a combination of the following: farm-level power curve, a turbine-level power curve, elevation, wind turbine location, wind farm location, weather conditions, location of nearby wind farms, geographical layout, or any other suitable site condition. Further, in particular embodiments, the operational data 154 may be part of the Supervisory Control and Data Acquisition (SCADA) system for remote monitoring and control of the wind farm 200 that operates with coded signals over communication channels. In additional embodiments, the controller(s) 26, 220 may be configured to further analyze (i.e. filter, average, and/or adjust) the operational data as described herein.

Still particularly to FIG. 4, as shown at 104, the method 100 may also optionally include predicting the forecast operational data for the wind farm 200 for a future time period. As shown in FIG. 5, it should be understood that the predicted/forecast operational data 156 may include any of the actual operational data described herein. Further, in certain embodiments, the future time period may include from about twelve (12) hours to about seven (7) days in the future as hourly predictions of forecast wind energy can enable a wind farm operator to bid into the day-ahead energy markets. Thus, energy forecasts a day or more in the future can enable a wind farm operation to plan maintenance scheduling when the forecast wind and associated power generation is low so as to minimize the amount of lost revenue during wind turbine and/or wind farm maintenance. In alternative embodiments, the future time period may include less than 12 hours or more than 7 days.

Further, as shown at 106 of FIG. 4, the method 100 also includes generating a model-based power output forecast 162 via a model 160 based on one or more of the actual operational data 154, the predicted/forecast operational data 156, and/or the site information 158. For example, as shown in FIG. 5, the model-based power output forecast 162 may generated by a physics-based model 160. As is generally understood, physics-based models are used to generate and visualize constrained shapes, motions of rigid and non-rigid objects, and/or object interactions with the surrounding environment for the purposes of animation modeling. Thus, controller(s) 26, 220 are configured to combine the actual operational data 154 and/or the predicted operational data 156 with a physics-based model representing the relationship between atmospheric information and the generated power output of the wind farm 200 and/or an individual wind turbine.

As shown at 108, the method 100 also includes measuring real-time operational data 166 of the wind farm 200. In certain embodiments, the real-time operational data 166 may be generated via one or more of the sensors (e.g. via sensors 65, 66, 68, 216, 218, or any other suitable sensor). In addition, the real-time operational data 166 may be determined via a computer model within the one of the controllers 26, 220. More specifically, as shown in FIG. 5, the real-time actual operational data 166 as described herein may include power output, torque output, pitch angle, tip speed ratio, yaw angle, temperature, pressure, time of day, month of year, number of wind turbines on-line, wind speed, wind direction, wind shear, wake, wind turbulence, wind acceleration, wind gusts, wind veer, or any other suitable operational data. In addition, the real-time operational data 166 may include any of the actual operational data 154 and/or site information 158 as described herein.

As shown at 110, the method 100 further includes adjusting or correcting the power output forecast 162 generated by the model 160 based on, at least, the measured real-time operational data 166. For example, as shown in FIG. 5, a compensator module 168 may be configured to adjust the power output forecast 162 as a function of the measured real-time operational data 166 and/or the previous predicted operational data 156. In such embodiments, the compensator module 156 may include a statistical compensator that utilizes at least one of a neural network, regression (e.g. linear or non-linear), or machine learning to adjust the power output forecast 162 based on the measured real-time operational data 166 and/or the previous predicted operational data 156.

Thus, as shown at 112, the method 100 includes forecasting the farm-level power output 172 of the wind farm 200 (or a turbine-level power output of an individual wind turbine) based on the adjusted power output forecast 162. In additional embodiments, the method 100 may include learning, via the compensator module 156, one or more deviations between the real-time operational data 166 and the predicted operational data 156 and forecasting the power output 172 of the wind farm 200 based on the learned deviations.

Figure 6:
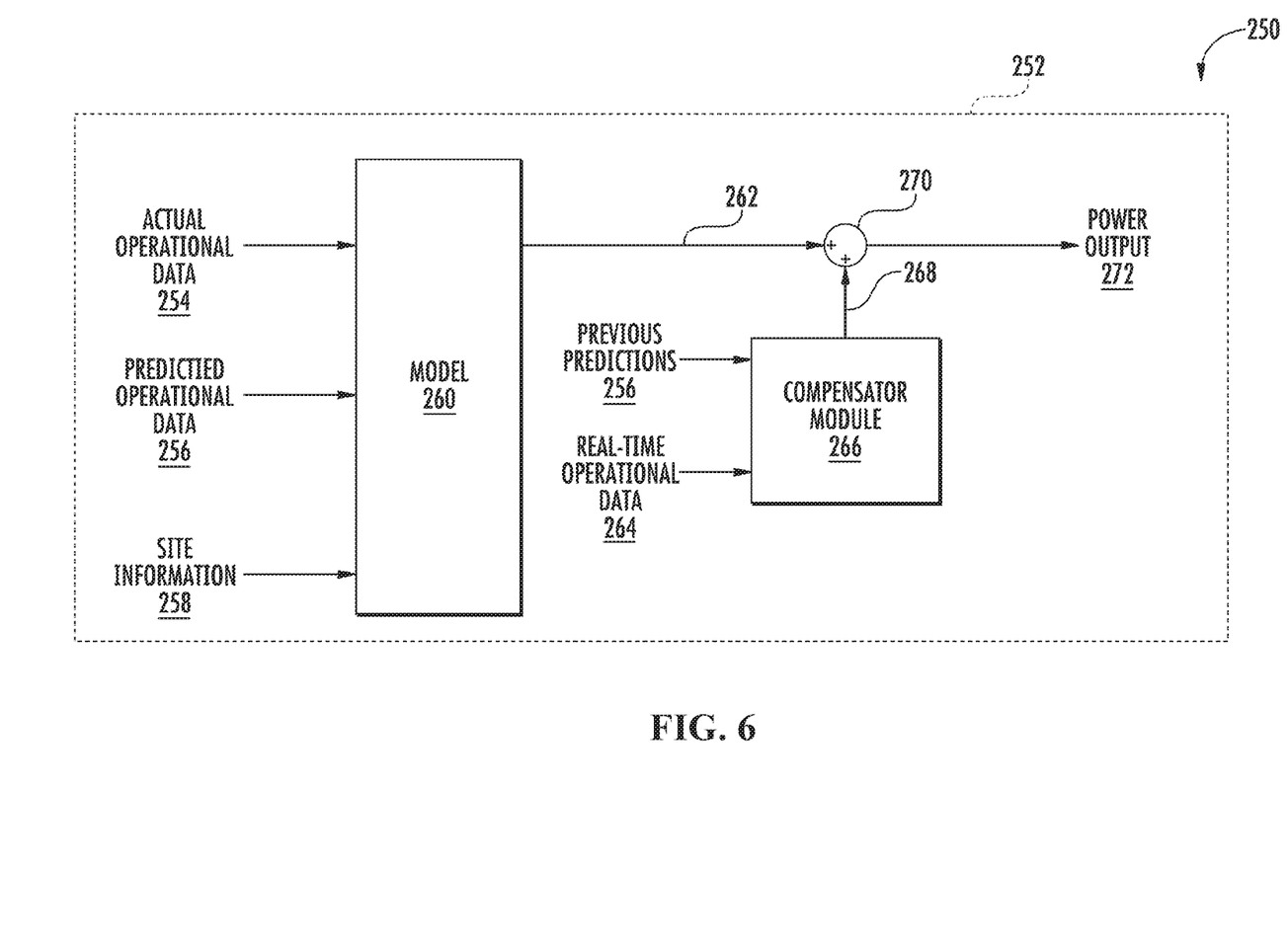

Referring now to FIG. 6, a schematic diagram of another embodiment of a system 250 for forecasting a farm-level power output of the wind farm 200 is illustrated. As shown, the system 250 includes a processor 252 configured to perform one or more operations. For example, as shown, the processor 252 is configured to collect actual operational data 254 and site information 256 for the wind farm 200 (or an individual wind turbine). Further, as shown, the processor 252 is configured to optionally predict operational data 256 for the wind farm 200 for a future time period. The actual operational data 254, the predicted operational data 256, and/or the site information 258 may include any of the operational data and/or site information as described herein.

As such, the processor 252 may also be configured to generate a model-based power output forecast 262 via model 260 based on the actual operational data 254, the predicted or predicted operational data 256, and/or the site information 258. Further, the processor 252 may include a compensator module 266 that is configured to measure real-time operational data 264 from the wind farm 200 and determine a deviation 268 between the real-time operational data 264 and the predicted operational data 256. As shown at 270, the processor is further configured to adjust the power output forecast 262 based on the deviation 268 and forecast the farm-level power output 272 of the wind farm 200 (or the turbine-level power output of an individual wind turbine) based on the adjusted power output forecast.

Exemplary embodiments of a wind farm, a controller for a wind farm, and a method for controlling a wind farm are described above in detail. The method, wind farm, and controller are not limited to the specific embodiments described herein, but rather, components of the wind turbines and/or the controller and/or steps of the method may be utilized independently and separately from other components and/or steps described herein. For example, the controller and method may also be used in combination with other power systems and methods, and are not limited to practice with only the wind turbine controller as described herein. Rather, the exemplary embodiment can be implemented and utilized in connection with many other wind turbine or power system applications.

Although specific features of various embodiments of the invention may be shown in some drawings and not in others, this is for convenience only. In accordance with the principles of embodiments of the invention, any feature of a drawing may be referenced and/or claimed in combination with any feature of any other drawing.

This written description uses examples to disclose embodiments of the invention, including the best mode, and also to enable any person skilled in the art to practice embodiments of the invention, including making and using any devices or systems and performing any incorporated methods. The patentable scope of embodiments of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for forecasting a farm-level power output of a wind farm having a plurality of wind turbines, the method comprising:
   collecting actual operational data and separately collecting site information for the wind farm;
   predicting forecast operational data for the wind farm for a future time period based on the actual operational data and the site information for the wind farm;
   with a physics-based model representing a relationship between atmospheric information and a generated power output of the wind farm, generating a model-based power output forecast based on the predicted forecast operational data and the site information;
   measuring real-time operational data from the wind farm, wherein the real-time operational data comprises at least one of or a combination of the following: power output, torque output, pitch angle, tip speed ratio, yaw angle, and number of on-line wind turbines;
   adjusting the model-based power output forecast based on the measured real-time operational data; and,
   forecasting the farm-level power output of the wind farm based on the adjusted model-based power output forecast.

2. The method of claim 1, wherein the model-based power output forecast is adjusted as a function of the measured real-time operational data and the predicted forecast operational data.

3. The method of claim 2, wherein the actual or the forecast operational data comprises at least one of or a combination of the following: power output, torque output, pitch angle, tip speed ratio, yaw angle, temperature, pressure, time of day, month of year, number of wind turbines on-line, wind speed, wind direction, wind shear, wake, wind turbulence, wind acceleration, wind gusts, or wind veer.

4. The method of claim 1, wherein the site information comprises at least one of a farm-level power curve, a turbine-level power curve, elevation, wind turbine location, wind farm location, weather conditions, location of nearby wind farms, or geographical layout.

5. The method of claim 1, further comprising adjusting the model-based power output forecast based on the measured real-time operational data via a compensator module.

6. The method of claim 5, wherein the compensator module comprises a statistical compensator that utilizes at least one of a neural network, regression, or machine learning to adjust the power output forecast based on the measured real-time operational data.

7. The method of claim 6, further comprising:
   learning, via the statistical compensator, one or more deviations between the real-time operational data and the predicted forecast operational data; and,
   adjusting the model-based power output forecast based on the learned deviation.

8. The method of claim 2, wherein the future time period comprises from about twelve (12) hours to about seven (7) days in the future.

9. A system for forecasting a farm-level power output of a wind farm having a plurality of wind turbines, the system comprising:
   a processor configured to perform one or more operations, the one or more operations comprising:
   collecting actual operational data and separately collecting site information for the wind farm;
   predicting forecast operational data for the wind farm for a future time period based on the actual operational data and the site information for the wind farm;
   with a physics-based model representing a relationship between atmospheric information and a generated power output of the wind farm, generating a model-based power output forecast based on forecast operational data and the site information;
   measuring real-time operational data from the wind farm, wherein the real-time operational data comprises at least one of or a combination of the following: power output, torque output, pitch angle, tip speed ratio, yaw angle, and number of on-line wind turbines;
   determining a deviation between the real-time operational data and the predicted forecast operational data;
   adjusting the model-based power output forecast based on the deviation; and, forecasting the farm-level power output of the wind farm based on the adjusted model-based power output forecast.

10. The system of claim 9, wherein the actual or the predicted forecast operational data comprises at least one of or a combination of the following: power output, torque output, pitch angle, tip speed ratio, yaw angle, temperature, pressure, time of day, month of year, number of wind turbines on-line, wind speed, wind direction, wind shear, wake, wind turbulence, wind acceleration, wind gusts, or wind veer, and wherein the site information comprises at least one of a farm-level power curve, a turbine-level power curve, elevation, wind turbine location, wind farm location, weather conditions, location of nearby wind farms, or geographical layout.

11. The system of claim 9, wherein the one or more operations further comprise adjusting the model-based power output forecast based on the deviation via a compensator module.

12. The system of claim 11, wherein the compensator module comprises a statistical compensator that utilizes at least one of a neural network, regression, or machine learning to adjust the power output forecast based on the measured real-time operational data.

* * * * *